US012303941B2

(12) United States Patent
Bissett

(10) Patent No.: US 12,303,941 B2
(45) Date of Patent: May 20, 2025

(54) UNDULATING SHAKER SCREEN ASSEMBLY

(71) Applicant: Continental Wire Cloth, LLC, Jenks, OK (US)

(72) Inventor: James R. Bissett, Broken Arrow, OK (US)

(73) Assignee: Continental Wire Cloth, LLC, Jenks, OK (US)

( * ) Notice: Subject to any disclaimer, the term of this patent is extended or adjusted under 35 U.S.C. 154(b) by 15 days.

(21) Appl. No.: 17/559,609

(22) Filed: Dec. 22, 2021

(65) Prior Publication Data

US 2022/0193727 A1 Jun. 23, 2022

Related U.S. Application Data

(60) Provisional application No. 63/130,049, filed on Dec. 23, 2020.

(51) Int. Cl.
*B07B 1/46* (2006.01)

(52) U.S. Cl.
CPC .......... *B07B 1/4663* (2013.01); *B07B 1/4618* (2013.01); *B07B 1/469* (2013.01)

(58) Field of Classification Search
CPC ...... B07B 1/4663; B07B 1/469; B07B 1/4618
See application file for complete search history.

(56) References Cited

U.S. PATENT DOCUMENTS 5,417,859 A 5/1995 Bakula
5,490,598 A 2/1996 Adams
5,598,930 A * 2/1997 Leone .................. B07B 1/4618 209/403
5,690,826 A 11/1997 Cravello
5,783,077 A 7/1998 Bakula
5,868,929 A 2/1999 Derrick et al.
5,876,552 A 3/1999 Bakula
5,944,993 A 8/1999 Derrick et al.
5,958,236 A 9/1999 Bakula
6,029,824 A 2/2000 Adams
6,032,806 A 3/2000 Leone et al.
6,209,726 B1 4/2001 Gallia
(Continued)

FOREIGN PATENT DOCUMENTS

GB 2312858 A * 11/1997 ......... B01D 33/0384
WO 2017176245 A1 10/2017

OTHER PUBLICATIONS

Written Opinion and International Search Report issued in related PCT Application No. PCT/US2021/064927, Date: Mar. 17, 2022.
(Continued)

*Primary Examiner* — Jacob S. Scott
*Assistant Examiner* — Miraj T. Patel
(74) *Attorney, Agent, or Firm* — McAfee & Taft

(57) ABSTRACT

A shaker screen assembly comprising a support frame and a screen subassembly attached to the support frame is provided. The screen subassembly includes a planar panel and a mesh section attached to the planar panel. The mesh section includes a series of undulations, each undulation including an elongated base portion and an elongated raised portion. Each of the elongated base portions includes a bottom planar portion, a first undulation side, and a second undulation side.

33 Claims, 8 Drawing Sheets

(56) References Cited

U.S. PATENT DOCUMENTS

| | | | | |
|---|---|---|---|---|
| 6,290,068 | B1 | 9/2001 | Adams et al. | |
| 6,325,216 | B1 * | 12/2001 | Seyffert | E21B 21/065 209/403 |
| 6,340,089 | B1 | 1/2002 | Bakula | |
| 6,564,947 | B2 | 5/2003 | Bakula | |
| 6,669,027 | B1 | 12/2003 | Mooney et al. | |
| 7,228,971 | B2 | 6/2007 | Mooney et al. | |
| 8,021,547 | B2 | 9/2011 | Hukki | |
| 2002/0000399 | A1 * | 1/2002 | Winkler | B01D 29/012 209/403 |
| 2002/0079251 | A1 | 6/2002 | Schulte et al. | |
| 2004/0112522 | A1 | 6/2004 | Ward et al. | |
| 2004/0211707 | A1 | 10/2004 | Lipa | |
| 2004/0245155 | A1 | 12/2004 | Strong et al. | |
| 2005/0035033 | A1 | 2/2005 | Adams et al. | |
| 2005/0056570 | A1 | 3/2005 | Colgrove et al. | |
| 2008/0029442 | A1 | 2/2008 | Schulte, Jr. | |
| 2014/0291238 | A1 | 10/2014 | Cady et al. | |
| 2016/0288171 | A1 | 10/2016 | Bissett | |
| 2018/0214798 | A1 | 8/2018 | Cady et al. | |
| 2018/0312667 | A1 | 11/2018 | Colgrove et al. | |
| 2019/0321859 | A1 | 10/2019 | Wojciechowski et al. | |
| 2020/0230653 | A1 * | 7/2020 | Walker | B01D 33/0376 |
| 2020/0246833 | A1 | 8/2020 | Wojciechowski | |

OTHER PUBLICATIONS

International Preliminary Report on Patentability issued in related PCT Application No. PCT/US2021/064927, Date: Jun. 13, 2023.

Examiner's report issued in related Canadian Patent Application No. 3,203,270, Date: Jul. 29, 2024.

* cited by examiner

UNDULATING SHAKER SCREEN ASSEMBLY

CROSS-REFERENCE TO RELATED APPLICATION

This application claims the benefit of prior-filed U.S. provisional application No. 63/130,049 (filed on Dec. 23, 2020), which is incorporated by reference herein.

BACKGROUND

A vibratory shaker machine, sometimes referred to as a shale shaker or mud shaker (hereafter a "shaker machine"), is used in the oil and gas industry and other industries to separate solids from a mixture of solids and liquids. For example, shaker machines are commonly used in processes for reclaiming used oil and gas well drilling mud in order to separate cuttings, rock and other solid particles from the mud before the used mud is further processed.

In operating a shaker machine, the mixture of solids and liquids is caused to flow onto and through a shaker screen assembly, which is removably attached to the shaker machine and functions to filter solids from the mixture of solids and liquids. In order to facilitate the filtration process and cause the separated solids to slide off the top of the shaker screen assembly as the process is carried out, the shaker screen assembly is caused to vibrate by the shaker machine. Usually, two or more shaker screen assemblies are positioned side by side on the shaker machine. The mixture of solids and liquids is typically discharged onto a first screen assembly and flows onto adjacent screen assemblies depending on the discharge volume and other factors. Due to the strong vibratory forces and harsh environments to which shaker screen assemblies are subjected, they tend to wear out relatively quickly. As a result, in many applications, the shaker screen assemblies mounted to a shaker machine must be replaced every couple of weeks or so.

A typical shaker screen assembly includes a support frame and a screen subassembly. The screen subassembly comprises a mesh section that includes one or more stainless steel mesh layers (for example, three mesh layers) and is attached to a perforated panel. The perforated panel supports the mesh section. The screen subassembly is attached to the top of the support frame. The support frame helps hold the shaker screen assembly in position within the shaker machine and supports the screen subassembly during use. The sizes of the various openings in the mesh layer(s) (and hence the mesh section) and the ultimate cut point and API classification of the shaker screen assembly vary depending on the particular application including the size of the solid particles that need to be separated from the mixture. Each type or model of shaker screen assembly is generally available in a variety of cut points and API classifications.

In the past, the mesh sections attached to the perforated panels of screen subassemblies have been generally flat in shape. In such a screen subassembly, the bottom of the mesh section is bonded, directly or indirectly, to the perforated panel which is, in turn, bonded to the frame to form the shaker screen assembly.

Today, although shaker screen assemblies having generally flat mesh sections (referred to herein as "flat shaker screen assemblies") are still in use, many screen subassemblies now have undulating mesh sections, that is, mesh sections that have a series of elongated base portions and elongated raised portions running from one side of the mesh section to the other. Shaker screen assemblies having undulating mesh sections, sometimes referred to as three-dimensional (3D) shaker screens (referred to herein as "undulating shaker screen assemblies"), can provide a significant increase in screen surface area (for example, up to an 80% increase) thereby substantially increasing the potential screening area and allowing the shaker screen assembly to process more fluid in a given amount of time. The undulating nature of the mesh section of an undulating shaker screen assembly increases the surface area and effective filter area of the shaker screen assembly while allowing the overall length and width of the assembly to stay the same, thereby allowing the assembly to continue to fit existing shaker machines.

Unfortunately, the increased screening area provided by an undulating shaker screen assembly is generally not fully utilized throughout the entire screening process. The elongated base portions of the undulating mesh section, often collectively referred to as an "opossum belly," are initially completely covered in fluid or "flooded" when the mixture of solids and liquids is first discharged on the screen assembly thereby taking advantage of the increased screening area. When the undulating mesh section is flooded, the fluid maximizes the full screen. However, after the initial deluge is processed and the initial flooding subsides, a much smaller volume of the fluid remains and is typically contained by the lowermost areas of elongated base portions and out of contact with the remaining screening area formed by the elongated base portions. Thus, following the flooding stage, the remaining screening area is not utilized.

Furthermore, in vibratory shaker machines that employ multiple undulating shaker screen assemblies (vibratory shaker machines commonly have three to four undulating shaker screen assemblies mounted side by side), only the screen assembly or assemblies onto which the mixture of solids and liquids is directly discharged (typically the screen assembly or assemblies at the back of the shaker machine) are flooded, making the increased screening areas of the remaining screens ineffective even during the initial flood stage. The remaining mixture of solids and liquids works it way along the lowermost areas of the elongated base areas and the increased screening area provided by the remaining sides of the elongated base portions is not utilized. This makes the lowermost areas of the elongated base portions wear out faster.

As a result, the screening efficacy of an undulating shaker screen assembly can actually be less than that of a traditional flat shaker screen assembly in some applications.

SUMMARY

An undulating shaker screen assembly is provided. The undulating shaker screen assembly comprises a support frame that defines a frame opening, the support frame having a top frame surface and a bottom frame surface opposing the top frame surface; and an undulating screen subassembly attached to the support frame. The undulating screen subassembly includes:

a planar panel having an upper panel surface, a lower panel surface opposing the upper panel surface, a panel peripheral sidewall connecting the upper panel surface and the lower panel surface together, and a plurality of panel perforations extending through the upper panel surface and the lower panel surface; and a mesh section attached to the planar panel and including at least one mesh layer, the mesh section having a top mesh section surface, a bottom mesh section surface opposing the top mesh section surface, a mesh section peripheral edge connecting the top mesh section surface and the bottom mesh section surface together, and a plurality of mesh section openings extending through the top mesh section surface and the bottom mesh section surface, wherein:

the mesh section peripheral edge includes a first side and an opposing second side;

the mesh section includes a series of elongated undulations extending from the first side of the mesh section peripheral edge to the second side of the mesh section peripheral edge, each of the elongated undulations including a planar base portion, a raised portion, a first undulation side and a second undulation side, wherein each of the undulation sides extends upwardly from the planar base portion, and wherein:

the planar base portion includes a first end, a second end, and a planar base portion length;

the first undulation side extends upwardly from the planar base portion at a first angle with respect to the planar base portion and includes a bottom end attached to the first end of the planar base portion, a top end attached to a raised portion, and a first undulation side length;

the second undulation side extends upwardly from the planar base portion at a second angle with respect to the planar base portion and includes a bottom end attached to the second end of the planar base portion, a top end attached to a raised portion, and a second undulation side length; and wherein the mesh section is attached to the planar panel such that the mesh section openings are positioned over the panel perforations and the planar base portions of the undulations are attached to the upper panel surface.

BRIEF DESCRIPTION OF THE DRAWINGS

The drawings included with this application illustrate certain aspects of specific embodiments of the process disclosed herein. However, the embodiments disclosed herein, as shown by the drawings, should not be viewed as the exclusive embodiments. The subject matter disclosed herein is capable of considerable modifications, alterations, combinations, and equivalents in form and function, as will occur to those skilled in the art with the benefit of this disclosure. For example, the specific views in the drawings are not representative of the exact size of the items shown.

FIG. 9 is a schematic diagram illustrating of the operation of the undulating shaker screen assembly shown by FIGS. 2-7 and the flow of a mixture of solids and liquids therethrough after the initial flood stage of the screening process.

DETAILED DESCRIPTION

Figure 1:
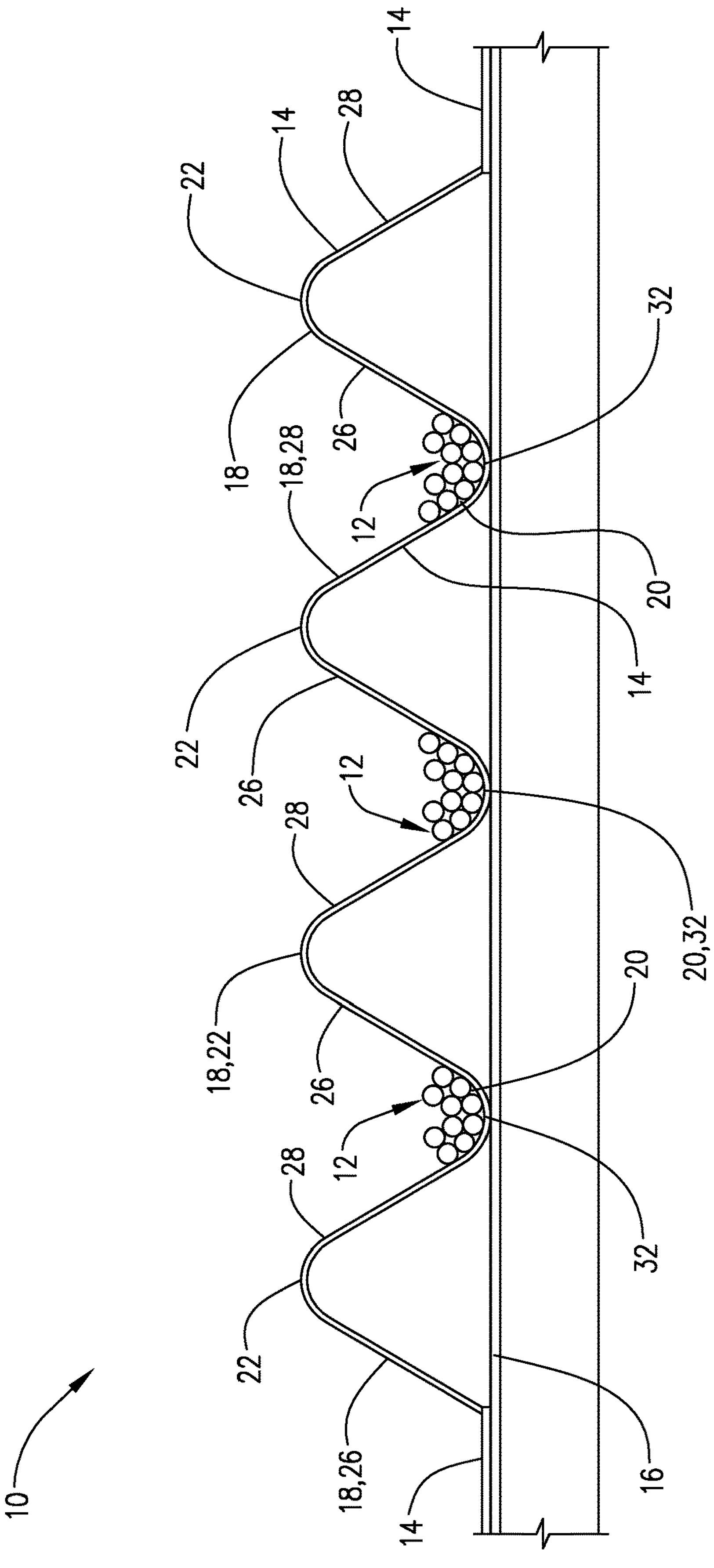
FIG-1 PRIOR ART
FIG. 1 [PRIOR ART] is a schematic diagram illustrating the operation of an undulating shaker screen assembly used heretofore and the flow of a mixture of solids and liquids therethrough after the initial flood stage of the screening process.
Figure 2:
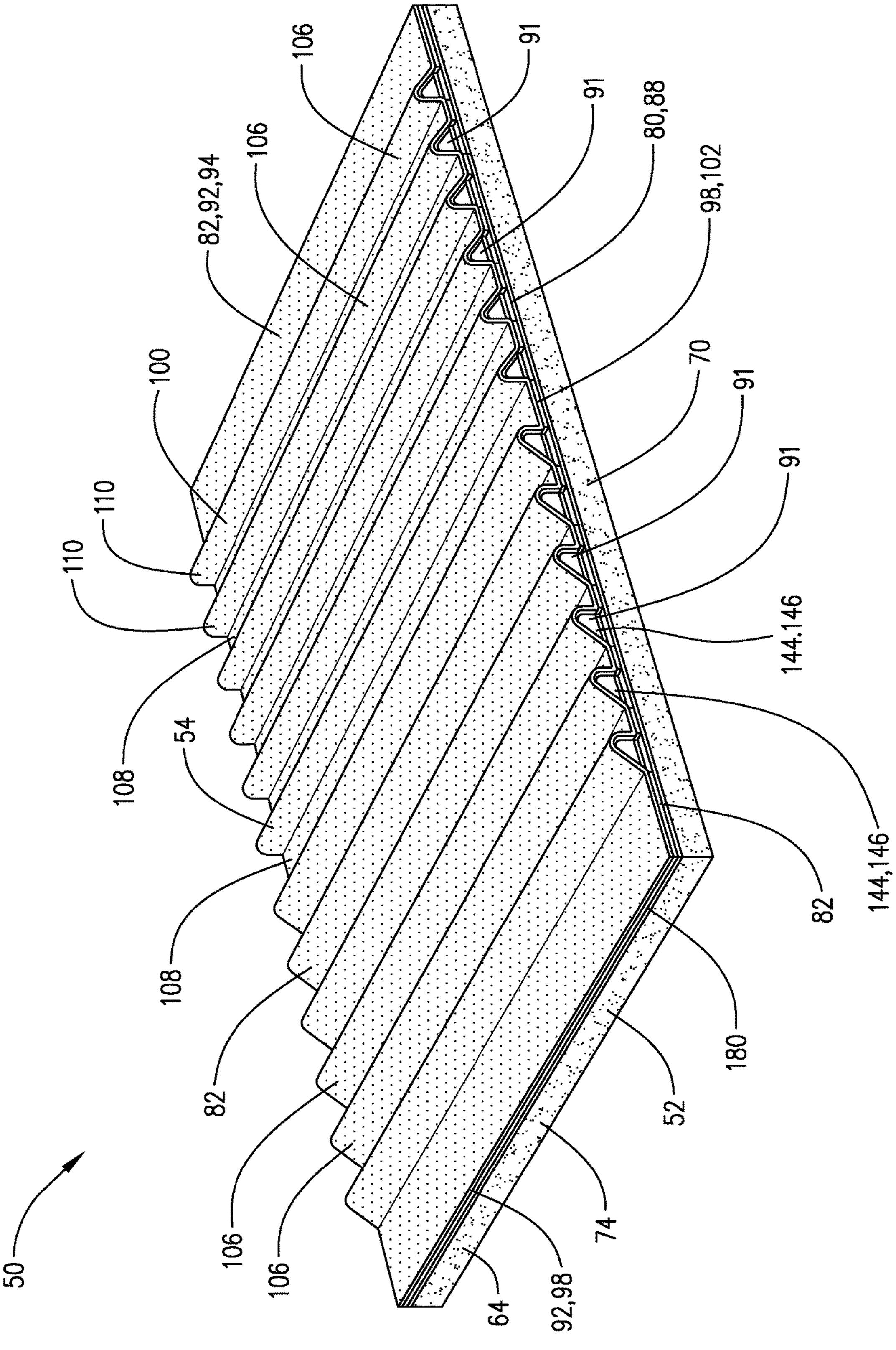
FIG. 2 is a top perspective view of the undulating shaker screen assembly disclosed herein.
Figure 3:
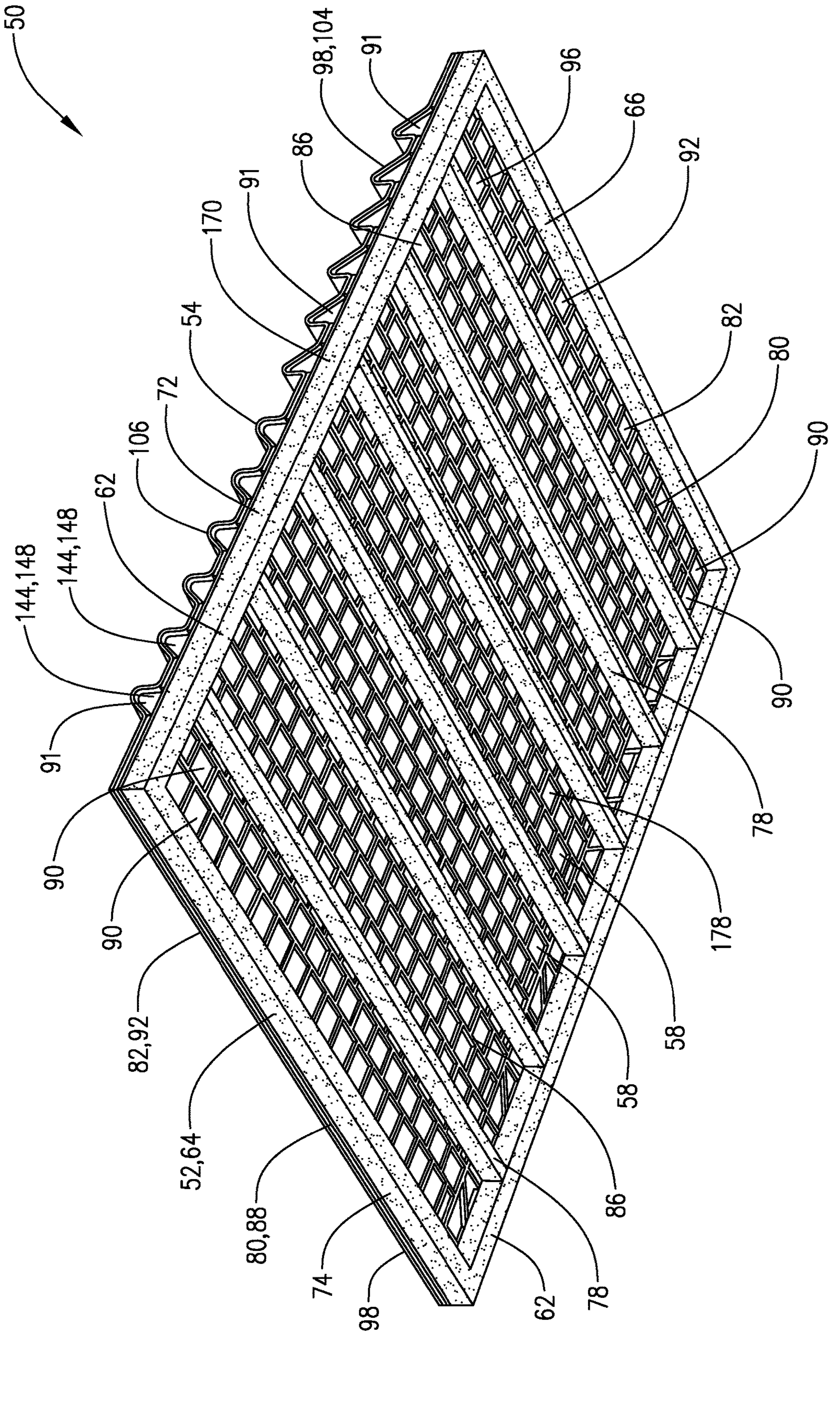
FIG. 3 is a bottom perspective view of the shaker screen assembly shown by FIG. 1.
Figure 4:
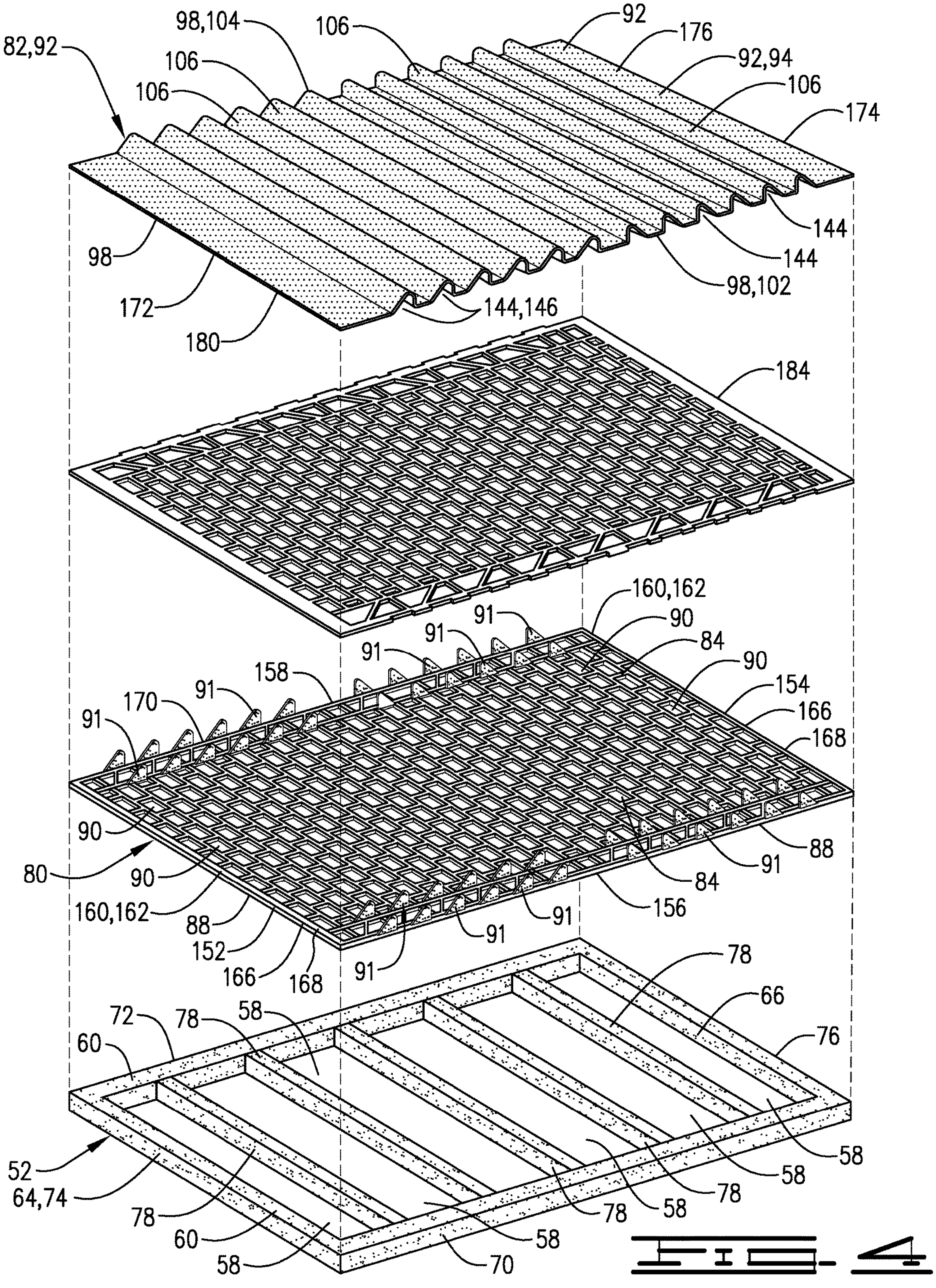
FIG. 4 is an exploded view of the shaker screen assembly shown by FIGS. 1 and 2 showing the components of the shaker screen assembly before they are bonded and attached together.
Figure 5:
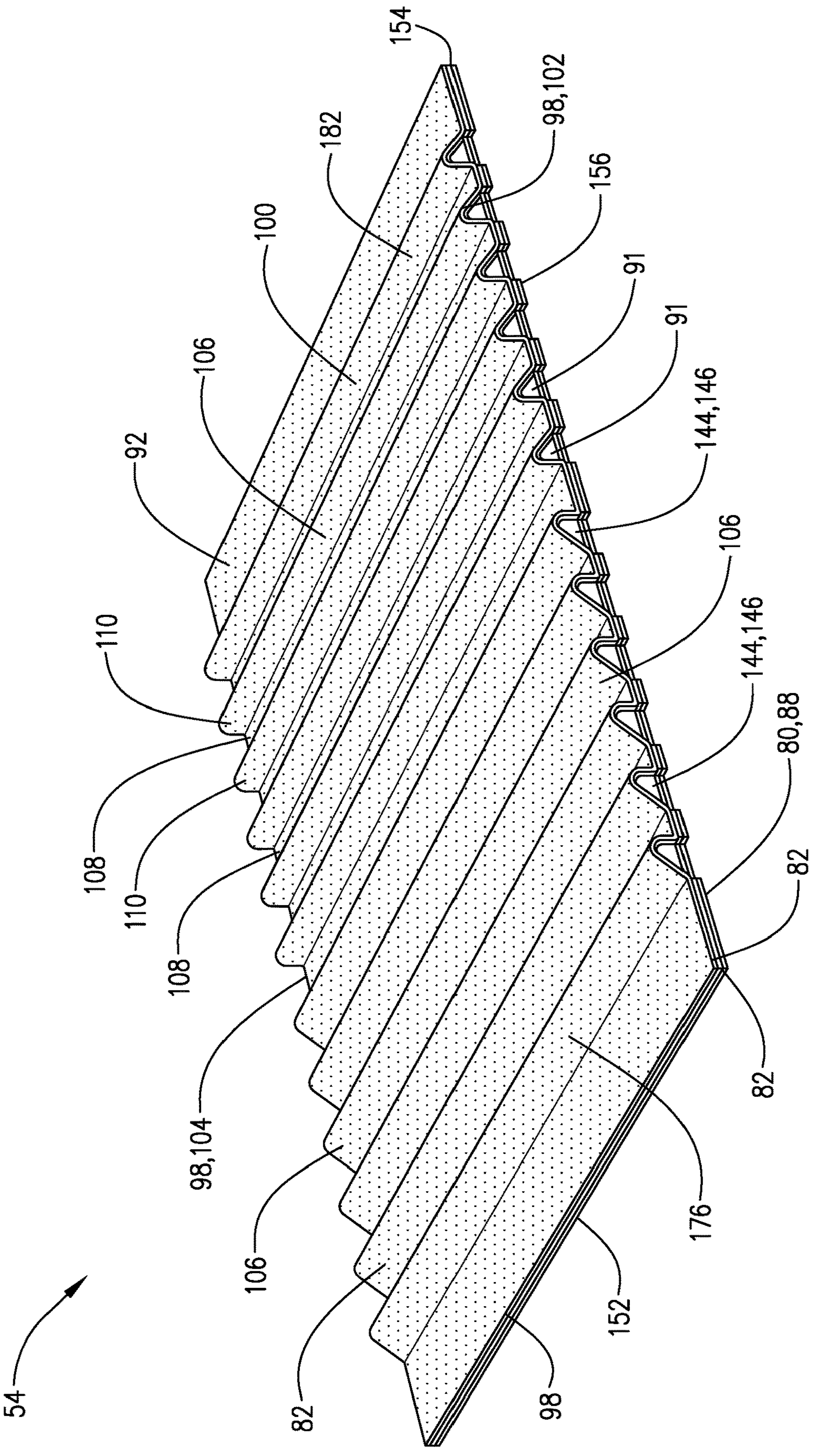
FIG. 5 is a top perspective view of the screen subassembly only (no frame) of the shaker screen shown by FIGS. 2-4.
Figure 6:
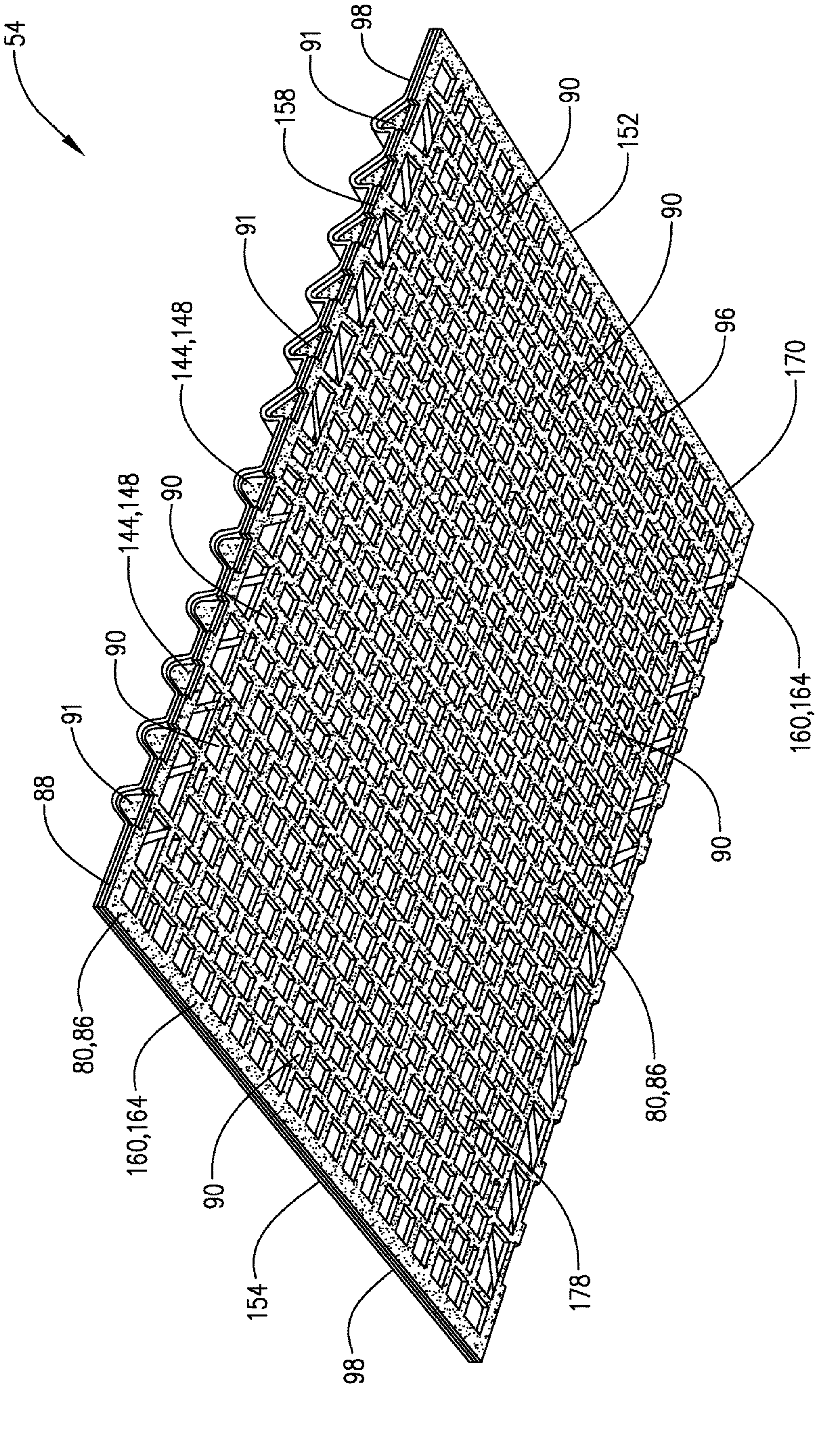
FIG. 6 is a bottom perspective view of the screen subassembly only (no frame) of the shaker screen shown by FIGS. 2-4.

The present disclosure may be understood more readily by reference to this detailed description as well as to the specific embodiments described herein. For simplicity and clarity of illustration, where appropriate, reference numerals may be repeated among portions of the drawings to indicate corresponding or analogous elements. In addition, numerous specific details are set forth in order to provide a thorough understanding of the disclosed subject matter and various embodiments described herein. However, it will be understood by those of ordinary skill in the art that the subject matter and embodiments described herein can be practiced without these specific details. In other instances, for example, components have not been described in detail so as not to obscure the related relevant feature being described. Also, the description is not to be considered as limiting the scope of the subject matter described herein. The drawings are not necessarily to scale and the proportions of certain parts may have been exaggerated to better illustrate details and features of the present disclosure.

As used herein and in the appended claims, terms describing the orientation of components such as top, bottom, lowermost, etc. are to be construed in view of the manner in which the components are oriented in the drawings included herewith.

As used herein and in the appended claims, an element or component that "comprises" or "includes" one or more specified components means that the element or component includes the specified component(s) alone, or includes the specified component(s) together with one or more additional components. An element or component that "consists of" one or more specified components means that the element or component includes only the specified component(s). An element or component that "consists essentially of" one or more specified components means that the element or component consists of the specified component(s) alone, or consists of the specified component(s) together with one or more additional components that do not materially affect the basic properties of the element or component. Whenever a range is disclosed herein, the range includes independently and separately every member of the range extending between any two numbers enumerated within the range. Furthermore, the lowest and highest numbers of any range shall be understood to be included within the range set forth.

Prior Art Undulating Shaker Screen Assembly

FIG. 1 is a schematic diagram illustrating the operation of an undulating shaker screen assembly 10 used heretofore, specifically the flow of a mixture of solids and liquids 12 therethrough after the initial flood stage of the screening process. As illustrated, the undulating shaker screen assembly 10 includes an undulating mesh section 14 attached to a planar panel 16. The undulating mesh section 14 includes a series of elongated undulations 18 extending from one side of the mesh section to the other. Each of the elongated undulations 18 includes a concave base portion 20, a raised portion 22, and a pair of undulation sides 26 and 28 upwardly extending from the concave base portion.

In operation of the prior art undulating shaker screen assembly 10, when the mixture of solids and liquids 12 is initially discharged onto the screen assembly, the elongated undulations 18 are flooded and the increased screening area provided by the upwardly extending undulation sides 26 and 28 are typically utilized. However, as shown by FIG. 1, after the flooding subsides, a much smaller volume of the mixture of solids and liquids 12 remains and is generally contained in a lowermost portion 32 of each elongated undulation 18 consisting of the concave base portion 20 and a small portion of each of the upwardly extending undulation sides 26 and 28. Thus, the mixture of solids and liquids 12 is out of contact with the remaining portions 34 of the undulation sides 26 and 28 thereby limiting the available screening area formed by the elongated undulations 18 for the remainder of the process. In shaker machines that employ multiple undulating shaker screen assemblies (vibratory shaker machines commonly have three to four shaker screens mounted side by side), only the screen assembly 10 or assemblies 10 onto which the mixture of solids and liquids is initially discharged are flooded, making the increased screening areas of the remaining screens ineffective even during the initial flood stage.

The Present Disclosure

In accordance with this disclosure, an undulating shaker screen assembly is provided.

Referring now to the FIGS. 2-9, the undulating shaker screen assembly, generally designated by the reference number 50, will be described. The undulating shaker screen assembly 50 comprises a support frame 52, and an undulating screen subassembly 54 attached to the support frame.

The support frame 52 defines a frame opening 58 and has a top frame surface 60, a bottom frame surface 62 opposing the top frame surface, an outside surface 64 and an inside surface 66. As shown by the drawings, the support frame 52 has the shape of a rectangle and also includes a pair of opposing frame sides 70 and 72, a pair of opposing frame ends 74 and 76 connecting the frame sides together, and a plurality of crossbars 78 extending between the frame sides and further connecting the frame sides together.

The support frame 52 is formed of a metal or steel. For example, the support frame 52 is formed of a metal. For example, the support frame 52 is formed of steel.

The undulating screen subassembly 54 includes a planar panel 80, and a mesh section 82 attached to the planar panel.

The planar panel 80 has an upper panel surface 84, a lower panel surface 86 opposing the upper panel surface, a panel peripheral sidewall 88 connecting the upper panel surface and the lower panel surface together, and a plurality of panel perforations 90 extending through the upper panel surface and the lower panel surface.

The planar panel 80 also includes plurality of sealing tabs 91 attached to the planar panel and extending approximately perpendicularly with respect to the upper panel surface 84 and the lower panel surface 86. As used herein and in the appended claims, "extending approximately perpendicularly with respect to the upper panel surface and the lower panel surface" means extending at an angle in the range of from about 70° to about 110° with respect to the upper panel surface 84 and the lower panel surface 86. For example, the sealing tabs 91 can extend at an angle in the range of from about 80° to about 100° with respect to the upper panel surface 84 and the lower panel surface 86. For example, the sealing tabs 91 can extend perpendicularly (that is, at an angle of about 90°) with respect to the upper panel surface 84 and the lower panel surface 86.

The planar panel 80 can be formed of a metal. For example, the planar panel 80 can be formed of iron. For example, the panel perforations 90 can have square or rectangular shapes.

The mesh section 82 includes at least one mesh layer 92, and has a top mesh section surface 94, a bottom mesh section surface 96 opposing the top mesh section surface, a mesh section peripheral edge 98 connecting the top mesh section surface and the bottom mesh section surface together, and a plurality of mesh section openings 100 extending through the top mesh section surface and the bottom mesh section surface.

Figure 7:
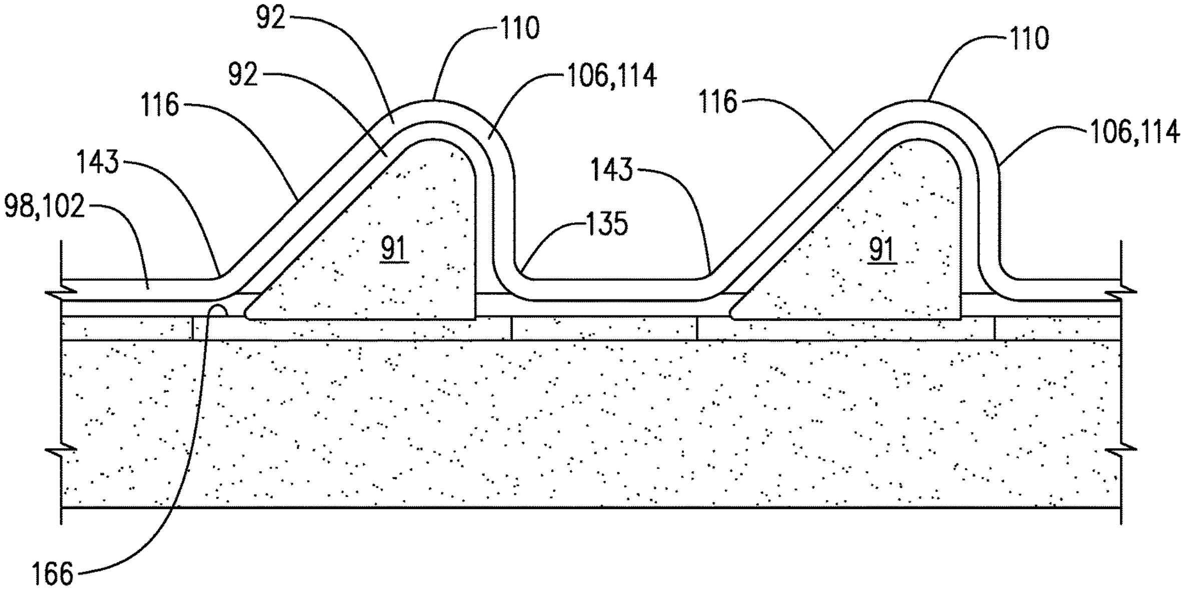
FIG. 7 is a an enlarged, side elevation view of the shaker screen assembly shown by FIGS. 2-6, illustrating the elongated undulations in detail.
Figure 8:
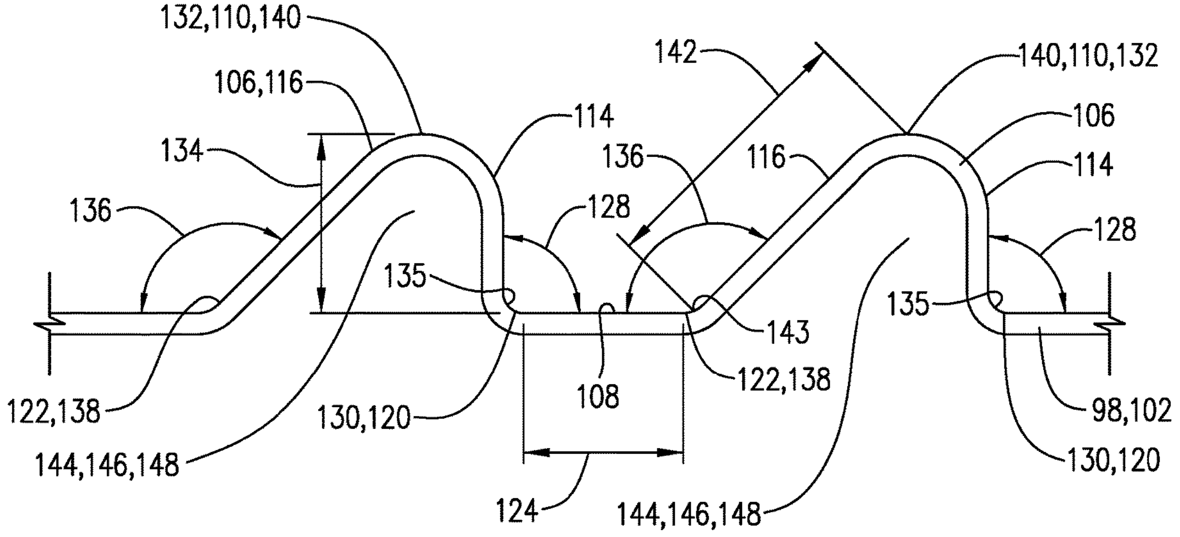
FIG. 8 is a an enlarged, side elevation view of the shaker screen assembly shown by FIGS. 2-6, illustrating the elongated undulations in detail.
Figure 8:
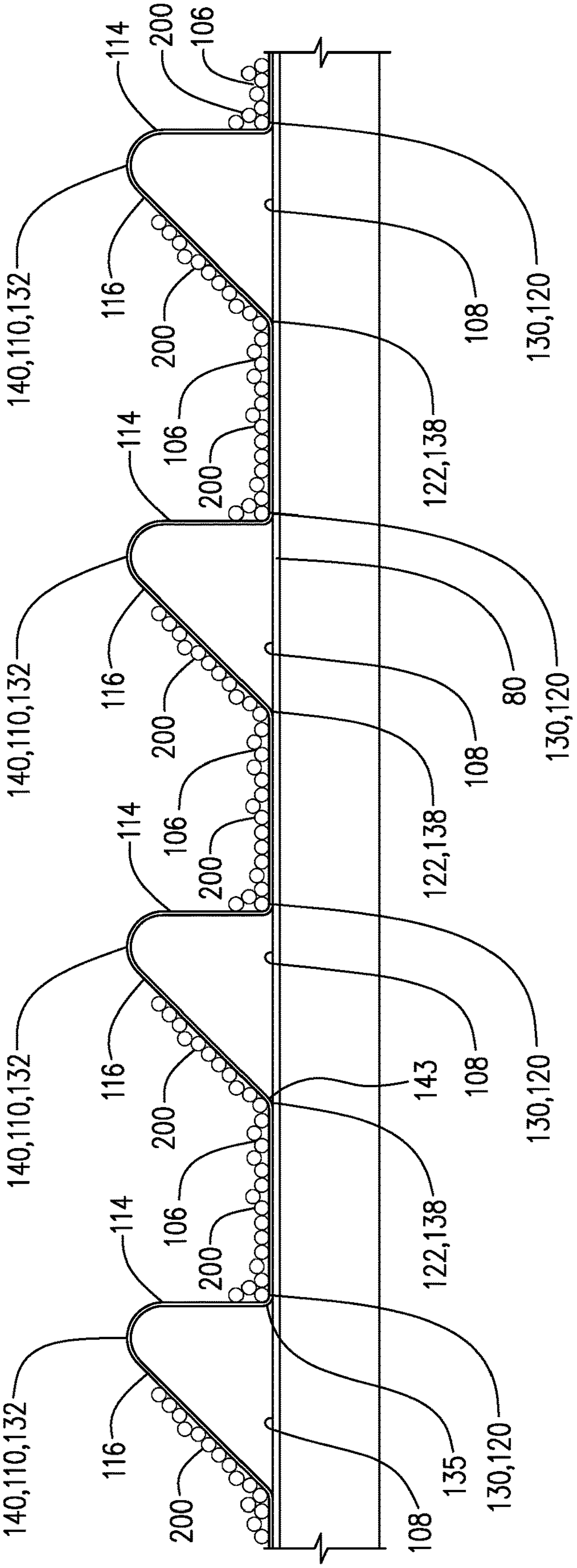

The mesh section peripheral edge 98 includes a first side 102 and an opposing second side 104. The mesh section 82 includes a series of elongated undulations 106 extending from the first side 102 of the mesh section peripheral edge 98 to the second side 104 of the mesh section peripheral edge. As best shown by FIGS. 7, 8 and 9, each of the elongated undulations 106 includes a planar base portion 108, a raised portion 110, a first undulation side 114, and a second undulation side 116. The first undulation side 114 and second undulation side 116 each extend upwardly from the planar base portion 108.

As shown, the raised portion 110 has a convex shape in that it is curved and rounded outwardly and upwardly with respect to the first and second undulation sides 114 and 116. The raised portion 110 can have other shapes as well.

The planar base portion 108 includes a first end 120, a second end 122, and a planar base portion length 124.

The first undulation side 114 extends upwardly from the planar base portion 108 at a first angle 128 with respect to the planar base portion and includes a bottom end 130 attached to the first end 120 of the planar base portion, a top end 132 attached to a raised portion 110, and a first undulation side length 134. The first undulation side 114 further includes a first curvilinear portion 135 adjacent to the bottom end 130 to facilitate the transition between the first undulation side and the planar base portion 108 for flow purposes.

The second undulation side 116 extends upwardly from the planar base portion 108 at a second angle 136 with respect to the planar base portion and includes a bottom end 138 attached to the second end 122 of the planar base portion, a top end 140 attached to an elongated raised portion 110, and a second undulation side length 142. The second undulation side 116 further includes a second curvilinear portion 143 adjacent to the bottom end 138 to facilitate the transition between the second undulation side and the planar base portion 108 for flow purposes.

As used herein and in the appended claims, the "planar base portion length" (referenced as the planar base portion length 124 herein) is the length of the planar base portion 108 between the first end 120 and second end 122 thereof. The "first undulation side length" (referenced as the first undulation side length 134 herein) is the length of the first undulation side 114 between the bottom end 130 and top end 132 thereof. The "second undulation side length (referenced as the second undulation side length 142 herein) is the length of the second undulation side 116 between the bottom end 138 and top end 140 thereof.

For example, the ratio of the planar base portion length 124 to the greater of the first undulation side length 134 and the second undulation side length 142 is in the range of from about 1:4 to about 5:3. For example, the ratio of the planar base portion length 124 to the greater of the first undulation side length 134 and the second undulation side length 142 is in the range of from about 2:3 to about 1:1. For example, the ratio of the planar base portion length 124 to the greater of the first undulation side length 134 and the second undulation side length 142 is in the range of from about 4:5 to about 3:4.

For example, the planar base portion length 124 is at least about 0.125 inch. For example, the planar base portion length 124 is in the range of from about 0.125 inch to about 10 inches. For example, the planar base portion length 124 is in the range of from about 0.5 inch to about 3 inches. For example, the planar base portion length 124 is in the range of from about 1.0 inch to about 1.5 inches.

For example, the first undulation side length 134 is at least about 0.25 inch. For example, the first undulation side length 134 is in the range of from about 0.25 inch to about 4 inches. For example, the first undulation side length 134 is in the range of from about 0.5 inch to about 2 inches. For example, the first undulation side length 134 is in the range of from about 0.75 inch to about 1.5 inches.

For example, the second undulation side length 142 is at least about 0.5 inch. For example, the second undulation side length 142 is in the range of from about 0.5 inch to about 6 inches. For example, the second undulation side length 142 is in the range of from about 0.75 inch to about 3 inches. For example, the second undulation side length 142 is in the range of from about 1.25 inches to about 2 inches.

For example, the total of the planar base portion length 124, first undulation side length 134 and second undulation side length 142, that is the length of the mesh section 82 from the beginning of one elongated undulation 106 to the adjacent elongated undulation 106 is from about 0.875 inch to about 20 inches. For example, the total of the planar base portion length 124, first undulation side length 134 and second undulation side length 142, that is the length of the mesh section 82 from the beginning of one elongated undulation 106 to the adjacent elongated undulation 106 is from about 1.75 inches to about 8 inches. For example, the total of the planar base portion length 124, first undulation side length 134 and second undulation side length 142, that is the length of the mesh section 82 from the beginning of one elongated undulation 106 to the adjacent elongated undulation 106 is from about 3 inches to about 5 inches.

For example, the first and second undulation sides 114 and 116 extend upwardly in opposite directions with respect to the planar base portion 108. For example, the first and second undulation sides 114 and 116 extend upwardly in the same direction with respect to the planar base portion 108. For example, the first angle 128 and second angle 136 can be the same. For example, the first angle 128 and second angle 136 can be different. For example, first angle 128 can be less than the second angle 136. For example, first angle 128 can be greater than the second angle 136.

For example, the first angle 128 is in the range of from about 80° to about 179°. For example, the first angle 128 is in the range of from about 90° to about 160°. For example, the first angle 128 is in the range of from about 90° to about 135°. For example, the first angle 128 is about 90°.

For example, the second angle 136 is in the range of from about 80° to about 179°. For example, the second angle 136 is in the range of from about 90° to about 160°. For example, the second angle 136 is in the range of from about 90° to about 135°. For example, the second angle 136 is about 90°.

The mesh section 82 is attached to the planar panel 80 such that the mesh section openings 100 are positioned over the panel perforations 90 and the planar base portions 108 of the undulations 106 are attached directly or indirectly to the upper panel surface. For example, the planar base portions 108 of the undulations 106 are attached directly to the upper panel surface.

The raised portions 110 of the undulations 106 form a series of elongated open areas 144 positioned between the upper panel surface 84 and the bottom mesh section surface 96 and extending over the panel perforations 90 from the first side 102 of the mesh section peripheral edge 98 to the second side 104 of the mesh section peripheral edge, each of the elongated open areas 144 having a first open end 146 and a second open end 148 opposing the first open end, each of the first and second open ends being positioned adjacent to the panel peripheral sidewall 88 and mesh section peripheral edge 98. A sealing tab 91 of the planar panel 80 is positioned in each of the first and second open ends 146 and 148 of the elongated open areas 144. As used herein and in the appended claims, "positioned in each of the first and second open ends 146 and 148 of the elongated open areas 144 means positioned either within or just outside of each of the first and second open ends of the open areas (i.e., close enough to cover and seal the openings once the process for manufacturing the shaker screen assembly 50 is complete). The sealing tabs 91 help prevent fluid from flowing or leaking through the open ends 146 and 148 of the elongated open areas 144 when the shaker screen assembly 50 is in use.

As shown by the drawings, the planar panel 80 also has the shape of a rectangle and further includes opposing first and second sidewall ends 152 and 154 and opposing first and second sidewall sides 156 and 158 connecting the first and second sidewall ends together. The sealing tabs 91 are attached to the first and second sidewall sides 156 and 158.

The planar panel 80 further comprises a panel peripheral section 160 positioned between the panel peripheral sidewall 88 and the panel perforations 90, the panel peripheral section having a top surface 162, a bottom surface 164 opposing the top surface, and an outside edge 166 and inside edge 168 connecting the top surface and the bottom surface together. The outside edge 166 of the panel peripheral section 160 is the panel peripheral sidewall 88. The sealing tabs 91 are attached to the outside edge 166 of the panel peripheral section 160 of the first and second sidewall sides 156 and 158.

Each of the support frame 52 and the planar panel 80 further include a powder coating 170. The powder coating 170 is deposited on all outside surfaces of the support frame 52 and planar panel 80. As discussed below, when heat is applied to the shaker screen assembly and components thereof, the powder coating 170 helps bond the various components of the shaker screen assembly together and seal the sealing tabs 91 within the open ends 146 and 148 of the elongated open areas 144.

As shown by the drawings, the mesh section 82 also has the shape of a rectangle. The mesh section peripheral edge 98 further includes a first end 172 and a second end 174 connecting the first side 102 and second side 104 of the mesh section peripheral edge together. For example, as best shown by FIG. 7, the mesh section 82 can include at least two mesh layers 92 positioned one on top of the other. For example, the mesh layers 92 can all have the same size and shape. As shown, the individual mesh layers each have the shape of a rectangle and each have a top mesh surface 176, a bottom mesh surface 178 opposing the top mesh surface, a mesh layer peripheral edge 180 connecting the top mesh surface and the bottom mesh surface together, and a plurality of mesh openings 182 extending through the top and bottom mesh surfaces. For example, the top mesh surface 176 of the uppermost mesh layer 92 is the top mesh section surface 94. For example, as shown by FIG. 8, in one embodiment, the mesh section 82 includes three mesh layers 92 positioned one on top of the other.

For example, the mesh section can further comprise at least one plastic layer 184 positioned adjacent to one or more of the mesh layers 92. For example, as shown, the plastic layer 184 is positioned between the upper panel surface 84, and the bottom mesh section surface 96. As discussed below, the plastic layer 184 helps the mesh layer(s) 92 bond together and facilitates the formation and durability of the undulations 106 in the mesh section 82 during the shaker screen assembly manufacturing process.

For example, the mesh layer(s) 92 can be formed of stainless steel. The sizes of the mesh openings 182 (and hence the mesh section openings 100) and the resulting cut point and API classification of the overall shaker screen assembly 50 can vary depending on the particular application including the size of the solid particles desired to be separated from the fluid to be filtered.

The undulating screen subassembly 54 can be attached to the support frame 52 by a variety of different attachment methods including attachment by rivets and attachment by glue or epoxy. As described below, the screen assembly can also be attached to the support frame by heating the components and allowing the powder coated support frame 52 to bond to the powder coated planar panel 80.

The shaker screen assembly 50 disclosed herein can be used in association with a vibratory shaker machine that is used, for example, to separate solids from a mixture of solids and liquids. For example, the shaker screen assembly 50 disclosed herein can be used in association with a vibratory shaker machine that is used to separate solids from used drilling mud.

The dimensions of the undulating shaker screen assembly 50, including the planar base portion length 124, first angle 128, first undulation side length, second angle 136, second undulation side length, and the ratio of the planar base portion length to the longer of the first undulation side length, can vary depending on the application including the type of shaker machine and other factors.

The undulating shaker screen assembly 50 provided herein is designed in a manner that takes advantage of the increased screening area provided by the undulating nature of the screen assembly both during the initial flooded stage when the mixture of solids and liquids is first discharged on the screen assembly and throughout the entire screening process.

For example, FIG. 9 is a schematic diagram illustrating the operation of the undulating shaker screen assembly 50, specifically the flow of a mixture of solids and liquids 200 therethrough after the initial flood stage of the screening process. When the mixture of solids and liquids 200 is initially discharged onto the undulating shaker screen assembly 50, the elongated undulations 106 are flooded and the increased screening area provided by the upwardly extending undulation sides 114 and 116 are typically utilized. After the flooding subsides, a much smaller volume of the mixture of solids and liquids 200 remains. However, even though the flooding has subsided, the mixture of solids and liquids 200 remains in contact with the entire planar base portions 108 and second undulation sides 116, thereby taking advantage of much more of the available screening area formed by the elongated undulations 106 for the remainder of the process (for example, as compared to the prior art undulating shaker screen assembly shown by FIG. 1). In shaker machines that employ multiple undulating shaker screen assemblies, the increased screening area of all of the screen assemblies are effective throughout the screening process.

For example, the planar base portion 108, planar base portion length 124, first angle 128, first undulation side length, second angle 136, second undulation side length, the ratio of the planar base portion length to the longer of the first undulation side length and the second undulation side length all cause the mixture of solids and liquids 200 to remain in contact with more screening area throughout the screening process. Tests have shown that in operation of the screen assembly 50, the mixture of solids and liquids 200 actually ride up and down the first and second undulation sides 114 and 116 and onto the planar base portions 108, back and forth. For example, the increased dispersion of the mixture 200 allows all or extensive portions of the first and second undulation sides 114 and 116 to remain usable even after the flood stage, which results in better separation and longer screen life by avoiding uneven wear. By utilizing both the increased surface area of the planar base portion 108 and the additional surface areas provided by the first and second undulation sides 114 and 116, the undulating shaker screen assembly 50 takes advantage of the best of both flat shaker screen assemblies and undulating shaker screen assemblies.

In one embodiment, the undulating shaker screen assembly comprises a support frame that defines a frame opening, the support frame having a top frame surface and a bottom frame surface opposing the top frame surface; and an undulating screen subassembly attached to the support frame. The undulating screen subassembly includes:

a planar panel having an upper panel surface, a lower panel surface opposing the upper panel surface, a panel peripheral sidewall connecting the upper panel surface and the lower panel surface together, and a plurality of panel perforations extending through the upper panel surface and the lower panel surface; and a mesh section attached to the planar panel and including at least one mesh layer, the mesh section having a top mesh section surface, a bottom mesh section surface opposing the top mesh section surface, a mesh section peripheral edge connecting the top mesh section surface and the bottom mesh section surface together, and a plurality of mesh section openings extending through the top mesh section surface and the bottom mesh section surface, wherein:

- the mesh section peripheral edge includes a first side and an opposing second side;
- the mesh section includes a series of elongated undulations extending from the first side of the mesh section peripheral edge to the second side of the mesh section peripheral edge, each of the elongated undulations including a planar base portion, a raised portion, a first undulation side and a second undulation side, wherein each of the undulation sides extends upwardly from the planar base portion, and wherein:
  - the planar base portion includes a first end, a second end, and a planar base portion length, wherein the planar base portion length is at least about 0.125 inch;
  - the first undulation side extends upwardly from the planar base portion at a first angle with respect to the planar base portion and includes a bottom end attached to the first end of the planar base portion, a top end attached to a raised portion, and a first undulation side length, wherein the first undulation side length is at least about 0.25 inch;

the second undulation side extends upwardly from the planar base portion at a second angle with respect to the planar base portion and includes a bottom end attached to the second end of the planar base portion, a top end attached to a raised portion, and a second undulation side length, wherein the second undulation side length is at least about 0.5 inch;

wherein the ratio of the planar base portion length to the longer of the first undulation side length and the second undulation side length is in the range of from about 1:4 to about 5:3; and wherein the mesh section is attached to the planar panel such that the mesh section openings are positioned over the panel perforations and the planar base portions of the undulations are attached to the upper panel surface.

In another embodiment, the undulating shaker screen assembly comprises a support frame that defines a frame opening, the support frame having a top frame surface and a bottom frame surface opposing the top frame surface; and an undulating screen subassembly attached to the support frame. The undulating screen subassembly includes:

a planar panel having an upper panel surface, a lower panel surface opposing the upper panel surface, a panel peripheral sidewall connecting the upper panel surface and the lower panel surface together, and a plurality of panel perforations extending through the upper panel surface and the lower panel surface; and a mesh section attached to the planar panel and including at least one mesh layer, the mesh section having a top mesh section surface, a bottom mesh section surface opposing the top mesh section surface, a mesh section peripheral edge connecting the top mesh section surface and the bottom mesh section surface together, and a plurality of mesh section openings extending through the top mesh section surface and the bottom mesh section surface, wherein:

the mesh section peripheral edge includes a first side and an opposing second side;

the mesh section includes a series of elongated undulations extending from the first side of the mesh section peripheral edge to the second side of the mesh section peripheral edge, each of the elongated undulations including a planar base portion, a raised portion, a first undulation side and a second undulation side, wherein each of the undulation sides extends upwardly from the planar base portion, and wherein:

the planar base portion includes a first end, a second end, and a planar base portion length, wherein the planar base portion length is at least about 0.125 inch;

the first undulation side extends upwardly from the planar base portion at a first angle with respect to the planar base portion and includes a bottom end attached to the first end of the planar base portion, a top end attached to a raised portion, and a first undulation side length, wherein the first undulation side length is at least about 0.25 inch and the first angle is in the range of from about 90° to about 160°;

the second undulation side extends upwardly from the planar base portion at a second angle with respect to the planar base portion and includes a bottom end attached to the second end of the planar base portion, a top end attached to a raised portion, and a second undulation side length, wherein the second undulation side length is at least about 0.5 inch and the second angle is in the range of from about 90° to about 160°;

wherein the ratio of the planar base portion length to the longer of the first undulation side length and the second undulation side length is in the range of from about 1:4 to about 5:3; and wherein the mesh section is attached to the planar panel such that the mesh section openings are positioned over the panel perforations and the planar base portions of the undulations are attached to the upper panel surface.

Therefore, the shaker screen assembly, screen subassembly and method disclosed herein are well adapted to attain the ends and advantages mentioned, as well as those that are inherent therein. The embodiments disclosed are illustrative only, as the shaker screen assembly, screen subassembly and method disclosed herein may be modified and practiced in different but equivalent manners, as will be apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified, and all such variations are considered within the scope and spirit of the present process. While the present shaker screen assembly, screen subassembly and method and the individual components and steps thereof may be described in terms of "comprising," "containing," "having," or "including" various steps or components, the process and system can also, in some examples, "consist essentially of" or "consist of" the various steps and components. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain ordinary meaning unless otherwise explicitly and clearly defined by the patentee.

What is claimed is:

1. An undulating shaker screen assembly, comprising:

a support frame that defines a frame opening, said support frame having a top frame surface and a bottom frame surface opposing said top frame surface; and an undulating screen subassembly attached to said support frame, said undulating screen subassembly, including:

a planar panel having an upper panel surface, a lower panel surface opposing said upper panel surface, a panel peripheral sidewall connecting said upper panel surface and said lower panel surface together, and a plurality of panel perforations extending through said upper panel surface and said lower panel surface; and a mesh section attached to said planar panel and including at least one mesh layer, said mesh section having a top mesh section surface, a bottom mesh section surface opposing said top mesh section surface, a mesh section peripheral edge connecting said top mesh section surface and said bottom mesh section surface together, and a plurality of mesh section openings extending through said top mesh section surface and said bottom mesh section surface, wherein:

said mesh section peripheral edge includes a first side and an opposing second side;

said mesh section includes a series of elongated undulations extending from said first side of said mesh section peripheral edge to said second side of said mesh section peripheral edge, each of said elongated undulations including a planar base portion, a raised portion, a first undulation side and a second undulation side, wherein each of said undulation sides extends upwardly from said planar base portion, and wherein:

said planar base portion includes a first end, a second end, and a planar base portion length;

said first undulation side extends upwardly from said planar base portion at a first angle with respect to said planar base portion and includes a bottom end attached to said first end of said planar base portion, a top end attached to a raised portion, and a first undulation side length;

said second undulation side extends upwardly from said planar base portion at a second angle with respect to said planar base portion and includes a bottom end attached to said second end of said planar base portion, a top end attached to a raised portion, and a second undulation side length, wherein said first angle and second angle are different such that said first angle is less than said second angle; and wherein said mesh section is attached to said planar panel such that said mesh section openings are positioned over said panel perforations and said planar base portions of said undulations are attached to said upper panel surface.

2. The shaker screen assembly of claim 1, wherein said support frame is formed of a metal or steel.

3. The shaker screen assembly of claim 1, wherein said planar panel is formed of a metal.

4. The shaker screen assembly of claim 1, wherein said mesh layer(s) is formed of stainless steel.

5. The shaker screen assembly of claim 1, wherein the ratio of said planar base portion length to the longer of said first undulation side length and said second undulation side length is in the range of from 1:4 to 5:3.

6. The shaker screen assembly of claim 5, wherein the ratio of said planar base portion length to the longer of said first undulation side length and said second undulation side length is in the range of from 2:3 to 1:1.

7. The shaker screen assembly of claim 1, wherein the planar base portion length is at least 0.125 inch.

8. The shaker screen assembly of claim 7, wherein the planar base portion length is in the range of from 0.125 inch to 10 inches.

9. The shaker screen assembly of claim 8, wherein the planar base portion length is in the range of from 0.5 inch to 3 inches.

10. The shaker screen assembly of claim 1, wherein said first undulation side length is at least 0.25 inch.

11. The shaker screen assembly of claim 10, wherein said first undulation side length is in the range of from 0.25 inch to 4 inches.

12. The shaker screen assembly of claim 11, wherein said first undulation side length is in the range of from 0.5 inch to 2 inches.

13. The shaker screen assembly of claim 1, wherein said second undulation side length is at least 0.5 inch.

14. The shaker screen assembly of claim 13, wherein said second undulation side length is in the range of from 0.5 inch to 6 inches.

15. The shaker screen assembly of claim 14, wherein said second undulation side length is in the range of from 0.75 inch to 3 inches.

16. The shaker screen assembly of claim 1, wherein the total of said planar base portion length, first undulation side length and second undulation side length is in the range of from 0.875 inch to 20 inches.

17. The shaker screen assembly of claim 1, wherein the first and second undulation sides extend upwardly in opposite directions with respect to the planar base portion.

18. The shaker screen assembly of claim 1, wherein the first and second undulation sides extend upwardly in the same direction with respect to the planar bottom portion.

19. The shaker screen assembly of claim 1, wherein said first angle is in the range from 80° to 160° and said second angle is in the range of from greater than 90° to 160°.

20. The shaker screen assembly of claim 1, wherein said first angle is in the range of from 80° to 100° and said second angle is in the range of from 110° to 160°.

21. The shaker screen assembly of claim 1, wherein said first angle is in the range of from 80° to 160°.

22. The shaker screen assembly of claim 21, wherein said first angle is in the range of from 80° to 100°.

23. The shaker screen assembly of claim 1, wherein said second angle is in the range of from greater than 90° to 160°.

24. The shaker screen assembly of claim 23, wherein said second angle is in the range of from 110° to 160°.

25. The shaker screen assembly of claim 1, wherein each of said support frame and said planar panel further include a powder coating, wherein said powder coating is deposited on all outside surfaces of the support frame and planar panel.

26. The shaker screen assembly of claim 1, wherein said mesh section includes at least two mesh layers positioned one on top of the other, each of said mesh layers having a top mesh surface, a bottom mesh surface opposing said top mesh surface, a mesh layer peripheral edge connecting said top mesh surface and said bottom mesh surface together, and a plurality of mesh openings extending through said top and bottom mesh surfaces.

27. The shaker screen assembly of claim 1, wherein said mesh section further includes at least one plastic layer attached to one or more of the mesh layers.

28. An undulating shaker screen assembly, comprising:

a support frame that defines a frame opening, said support frame having a top frame surface and a bottom frame surface opposing said top frame surface; and an undulating screen subassembly attached to said support frame, said undulating screen subassembly, including:

a planar panel having an upper panel surface, a lower panel surface opposing said upper panel surface, a panel peripheral sidewall connecting said upper panel surface and said lower panel surface together, and a plurality of panel perforations extending through said upper panel surface and said lower panel surface; and a mesh section attached to said planar panel and including at least one mesh layer, said mesh section having a top mesh section surface, a bottom mesh section surface opposing said top mesh section surface, a mesh section peripheral edge connecting said top mesh section surface and said bottom mesh section surface together, and a plurality of mesh section openings extending through said top mesh section surface and said bottom mesh section surface, wherein:

said mesh section peripheral edge includes a first side and an opposing second side;

said mesh section includes a series of elongated undulations extending from said first side of said mesh section peripheral edge to said second side of said mesh section peripheral edge, each of said elongated undulations including a planar base portion, a raised portion, a first undulation side and a second undulation side, wherein each of said undulation sides extends upwardly from said planar base portion, and wherein:

said planar base portion includes a first end, a second end, and a planar base portion length, wherein said planar base portion length is at least 0.125 inch;

said first undulation side extends upwardly from said planar base portion at a first angle with respect to said planar base portion and includes a bottom end attached to said first end of said planar base portion, a top end attached to a raised portion, and a first undulation side length, wherein said first undulation side length is at least 0.25 inch; and said second undulation side extends upwardly from said planar base portion at a second angle with respect to said planar base portion and includes a bottom end attached to said second end of said planar base portion, a top end attached to a raised portion, and a second undulation side length, wherein said second undulation side length is at least 0.5 inch, wherein said first angle and second angle are different such that said first angle is less than said second angle;

wherein the ratio of said planar base portion length to the longer of said first undulation side length and said second undulation side length is in the range of from 1:4 to 5:3; and wherein said mesh section is attached to said planar panel such that said mesh section openings are positioned over said panel perforations and said planar base portions of said undulations are attached to said upper panel surface.

29. The shaker screen assembly of claim 28, wherein the ratio of said planar base portion length to the longer of said first undulation side length and said second undulation side length is in the range of from 2:3 to 1:1.

30. The shaker screen assembly of claim 28, wherein the planar base portion length is in the range of from 0.125 inch to 10 inches.

31. The shaker screen assembly of claim 28, wherein the first undulation side length is in the range of from 0.25 inch to 4 inches.

32. The shaker screen assembly of claim 30, wherein said second undulation side length is in the range of from 0.5 inch to 6 inches.

33. An undulating shaker screen assembly, comprising:

a support frame that defines a frame opening, said support frame having a top frame surface and a bottom frame surface opposing said top frame surface; and an undulating screen subassembly attached to said support frame, said undulating screen subassembly, including:

a planar panel having an upper panel surface, a lower panel surface opposing said upper panel surface, a panel peripheral sidewall connecting said upper panel surface and said lower panel surface together, and a plurality of panel perforations extending through said upper panel surface and said lower panel surface; and a mesh section attached to said planar panel and including at least one mesh layer, said mesh section having a top mesh section surface, a bottom mesh section surface opposing said top mesh section surface, a mesh section peripheral edge connecting said top mesh section surface and said bottom mesh section surface together, and a plurality of mesh section openings extending through said top mesh section surface and said bottom mesh section surface, wherein:

said mesh section peripheral edge includes a first side and an opposing second side;

said mesh section includes a series of elongated undulations extending from said first side of said mesh section peripheral edge to said second side of said mesh section peripheral edge, each of said elongated undulations including a planar base portion, a raised portion, a first undulation side and a second undulation side, wherein each of said undulation sides extends upwardly from said planar base portion, and wherein:

said planar base portion includes a first end, a second end, and a planar base portion length, wherein said planar base portion length is at least 0.125 inch;

said first undulation side extends upwardly from said planar base portion at a first angle with respect to said planar base portion and includes a bottom end attached to said first end of said planar base portion, a top end attached to a raised portion, and a first undulation side length, wherein said first undulation side length is at least 0.25 inch and said first angle is in the range of from 80° to 160°; and said second undulation side extends upwardly from said planar base portion at a second angle with respect to said planar base portion and includes a bottom end attached to said second end of said planar base portion, a top end attached to a raised portion, and a second undulation side length, wherein said second undulation side length is at least 0.5 inch and said second angle is in the range of from greater than 90° to 160°, wherein said first angle and second angle are different such that said first angle is less than said second angle;

wherein the ratio of said planar base portion length to the longer of said first undulation side length and said second undulation side length is in the range of from 1:4 to 5:3; and wherein said mesh section is attached to said planar panel such that said mesh section openings are positioned over said panel perforations and said planar base portions of said undulations are attached to said upper panel surface.

* * * * *